(12) United States Patent
Kang et al.

(10) Patent No.: US 10,102,248 B2
(45) Date of Patent: Oct. 16, 2018

(54) JOIN TYPE FOR OPTIMIZING DATABASE QUERIES

(71) Applicant: TIBERO Co., Ltd., Gyeonggi-do (KR)

(72) Inventors: BongChae Kang, Gyeonggi-do (KR);
Sang Young Park, Gyeonggi-do (KR);
Sukwon Yi, Gyeonggi-do (KR);
Youngjae Choi, Gyeonggi-do (KR)

(73) Assignee: TMAXDATA CO., LTD., Gyeonggi-Do (KR)

( * ) Notice: Subject to any disclaimer, the term of this patent is extended or adjusted under 35 U.S.C. 154(b) by 655 days.

(21) Appl. No.: 14/606,586

(22) Filed: Jan. 27, 2015

(65) Prior Publication Data
US 2015/0142775 A1 May 21, 2015

Related U.S. Application Data

(63) Continuation-in-part of application No. 13/741,522, filed on Jan. 15, 2013, now abandoned.

(51) Int. Cl.
*G06F 17/30* (2006.01)

(52) U.S. Cl.
CPC .. *G06F 17/30466* (2013.01); *G06F 17/30451* (2013.01); *G06F 17/30489* (2013.01); *G06F 17/30436* (2013.01); *G06F 17/30463* (2013.01)

(58) Field of Classification Search
CPC .................................................. G06F 17/30466
See application file for complete search history.

(56) References Cited

U.S. PATENT DOCUMENTS

| | | | | | |
|---|---|---|---|---|---|
| 5,367,675 | A | * | 11/1994 | Cheng | G06F 17/30451 |
| 5,412,804 | A | * | 5/1995 | Krishna | G06F 17/30466 |
| 5,615,361 | A | * | 3/1997 | Leung | G06F 17/30436 |
| | | | | | 707/714 |
| 5,724,570 | A | * | 3/1998 | Zeller | G06F 17/30451 |
| 5,761,657 | A | * | 6/1998 | Hoang | G06F 17/30463 |
| 5,822,750 | A | * | 10/1998 | Jou | G06F 17/30451 |
| 6,032,143 | A | * | 2/2000 | Leung | G06F 17/30451 |
| 6,088,524 | A | * | 7/2000 | Levy | G06F 17/30454 |
| | | | | | 707/713 |
| 6,339,768 | B1 | * | 1/2002 | Leung | G06F 17/30451 |
| 6,411,951 | B1 | * | 6/2002 | Galindo-Legaria | |
| | | | | | G06F 17/30436 |
| 6,826,562 | B1 | * | 11/2004 | Leung | G06F 17/30451 |
| | | | | | 707/713 |

(Continued)

*Primary Examiner* — Mariela Reyes
*Assistant Examiner* — Edward Jacobs
(74) *Attorney, Agent, or Firm* — Bacon & Thomas, PLLC

(57) ABSTRACT

A query complier analyzes a query to identify a correlated scalar subquery. The query complier transforms the query having the correlated scalar subquery into a query of AGGREGATION INNER/OUTER JOIN or MAX1ROW INNER/OUTER JOIN depending on a result type of the correlated scalar subquery. The AGGREGATION INNER/OUTER JOIN performs JOIN on the rows of the correlated scalar subquery with the rows of a main query and AGGREGATE on the joined rows and returns a result of the joined rows of the main query and aggregation value thereof. The MAX1ROW INNER/OUTER JOIN performs JOIN on the rows of the correlated scalar subquery with the rows of a main query, raises Error when the number of joined rows of the subquery is two or more and returns a result of the row of the main query and the joined row of the subquery.

15 Claims, 12 Drawing Sheets

(56) References Cited

U.S. PATENT DOCUMENTS

| | | | |
|---|---|---|---|
| 7,246,108 B2* | 7/2007 | Ahmed | G06F 17/30451 |
| 7,275,056 B2* | 9/2007 | Cheng | G06F 17/30451 |
| 7,577,647 B2* | 8/2009 | Graefe | G06F 17/30454 |
| 8,521,723 B1* | 8/2013 | Ahmed | G06F 17/30448 707/714 |
| 2003/0078909 A1* | 4/2003 | Pham | G06F 17/30454 |
| 2003/0088558 A1* | 5/2003 | Zaharioudakis | G06F 17/30457 |
| 2006/0026115 A1* | 2/2006 | Ahmed | G06F 17/30451 |
| 2006/0041537 A1* | 2/2006 | Ahmed | G06F 17/3097 |
| 2007/0168324 A1* | 7/2007 | Grabs | G06F 17/30463 |
| 2008/0306906 A1* | 12/2008 | Zuzarte | G06F 17/30979 |
| 2011/0029508 A1* | 2/2011 | Al-Omari | G06F 17/30433 707/718 |

* cited by examiner

GROUP TABLE

| Col 1 | Col 2 |
|---|---|
| 31 | 1 |
| 33 | 5 |
| 31 | 4 |
| 33 | 4 |
| 31 | 3 |
| 34 | 5 |

AGGR TABLE

| Col 3 | Col 4 |
|---|---|
| 100 | 31 |
| 110 | 33 |
| 120 | 31 |
| 150 | 34 |
| 90 | 34 |
| 80 | 33 |

RESULT OF aggr_join1

| Col 2 | AGGREGATION |
|---|---|
| 1 | SUM(Col3)=220 Count(Col3)=2 |
| 4 | SUM(Col3)=220 Count(Col3)=2 |
| 3 | SUM(Col3)=220 Count(Col3)=2 |
| 5 | SUM(Col3)=190 Count(Col3)=2 |
| 4 | SUM(Col3)=190 Count(Col3)=2 |
| 5 | SUM(Col3)=240 Count(Col3)=2 |

MEMORY TABLE OF aggr_join1

| Col 1 | Col 2 | AGGREGATION |
|---|---|---|
| 31 | 1 | SUM(Col3)=220 Count(Col3)=2 |
| 31 | 4 | |
| 31 | 3 | |
| 33 | 4 | SUM(Col3)=190 Count(Col3)=2 |
| 33 | 3 | |
| 34 | 5 | SUM(Col3)=240 Count(Col3)=2 |

RESULT OF GROUP BY AGGREGATION

| Col 2 | AVG(col3) |
|---|---|
| 1 | 110 |
| 4 | 102.5 |
| 3 | 110 |
| 5 | 107.5 |

FIG.7B

MEMORY TABLE OF aggr_join2

| Col 1 | ROW COUNT | AGGREGATION |
|---|---|---|
| 31 | 3 | SUM(Col3)=220<br>Count(Col3)=2 |
| 33 | 2 | SUM(Col3)=190<br>Count(Col3)=2 |
| 34 | 1 | SUM(Col3)=240<br>Count(Col3)=2 |

RESURT OF aggr_join2

| Col 1 | AVG(col3) |
|---|---|
| 31 | 110 |
| 33 | 80 |
| 34 | 120 |

FIG.7C

DRIVING TABLE

| Col 1 | Col 2 |
|---|---|
| 31 | 1 |
| 33 | 5 |
| 31 | 4 |
| 33 | 4 |
| 31 | 3 |
| 34 | 5 |

INNER TABLE

| Col 3 | Col 4 |
|---|---|
| 100 | 31 |
| 110 | 33 |
| 120 | 31 |
| 150 | 34 |
| 90 | 34 |
| 80 | 33 |

JOINED

ERROR

JOIN TYPE FOR OPTIMIZING DATABASE QUERIES

RELATED APPLICATIONS

This application is a continuation-in-part (CIP) application of pending U.S. patent application Ser. No. 13/741,522 filed on Jan. 15, 2013.

FIELD OF THE INVENTION

The present invention relates to a query compiler for use in a database management system, and more particularly, to a query compiler and a method for optimizing database queries.

BACKGROUND OF THE INVENTION

Generally, a database stores data with correlation, and the data stored in the database are needed to be updated, inserted, and deleted. Thus, the database is managed by a software system called a database management system (DBMS). The DBMS is an integrated data management system that allows application programs to search or change desired data so as to provide consistent results to the application programs at all times.

In order to fetch the data stored in the database, a query is written using a query language called a structured query language (SQL). An operation for converting an SQL query to a query execution plan that can be conducted in the database is executed by a query compiler. The query execution plan is comprised of a tree having nodes of operations required to execute a query.

In an actual query compiler, the procedure of converting an SQL query to a query execution plan is performed as follows.

First, a query is parsed to form a parse tree structure. Next, a query rewrite process is performed to transform the parse tree to a more general form of the parse tree. Next, the transformed parse tree is again transformed to an execution plan having a minimum cost based on statistic information.

Of course, a result may be correctly obtained even without any query rewriting process. Making the parse tree into a more general form by the query rewriting is to make more execution plans, which results in raising the possibility to obtain the more optimized execution plan.

Further, the query rewriting may also be used to remove portions that are included in the original query but that need not to be operated, thereby improving the performance of the query compiler as well as query execution.

Therefore, it is desired to rewrite the queries so that the optimized execution plans can be established in the query compiler.

In transforming a query having correlated scalar subqueries, one way is to transform a subquery into a join type by unnesting it. With regard to the above, U.S. Pat. No. 8,521,723, issued on Aug. 27, 2013 and entitled "TRANSFORMING CORRELATED SCLAR SUBQUERIES", discloses a method for transforming an initial query having a scalar subquery with correlated predicates into a transformed query having transformed predicates that are not in the scalar subquery.

However, the above-mentioned prior art merely discloses a commonly known method to transform a subquery into a join type by unnesting it and fails to describe how to perform an unnest operation on queries having correlated scalar subqueries that are identified depending on the type of the identified correlated scalar subquery into the type of quasi-JOIN. Further, the above-mentioned prior art, when performing SQL Join queries, carries out a Group by Aggregation and an Aggregation Join in consecutive order without utilizing common elements between them. Accordingly, a continued computation without utilizing common elements entails an exponentially increased workload of a processing unit such as CPUs, which results in a large amount of outputs.

SUMMARY OF THE INVENTION

In view of the above, the embodiment of the present invention provides a query compiler and a method used by a query compiler.

Further, the embodiment of the present invention provides a query compiler and a method, which is capable of optimizing queries, through the use of a join that Group by Aggregation and JOIN are combined; which is capable of reducing the computational amount, throughput, and workload of a processing unit in a way of re-using a computed result based on a condition without performing a computation in a case where there are duplicated common rows meeting the condition and reducing the usage of a disk or memory in a way of performing a grouping at a node of Group by Aggregation to reduce results in case where there is a shortage of an available memory even though group and join keys do not match each other; is capable of reducing overload, which causes the Group by node to be needed, due to the free of the node of Group by Aggregation in a way of calculating aggregation while joining the join keys and counting the rows having the join key of same value to self-merge the aggregations as many as the counted number of the rows; and is capable of reducing the workload of calculating the columns in a case where the group and join keys match each other.

In accordance with a first aspect of the present invention, there is provided a method for optimizing database queries, which includes: searching a subquery within a query; analyzing the searched subquery to identify a candidate of a scalar subquery; analyzing the candidate scalar subquery to identify a candidate of a correlated scalar subquery; and transforming the query having the candidate correlated scalar subquery into a query of a quasi-JOIN according to a result type of the candidate correlated scalar subquery.

In the method, the analyzing the searched subquery includes: analyzing whether the searched subquery is written along with a comparison operator while being included in WHERE clause to identify the searched subquery as the candidate scalar subquery.

In the method, the analyzing the searched subquery includes: analyzing whether the searched subquery is included in SELECT clause to identify the searched subquery as the candidate scalar subquery.

In the method, the analyzing the candidate scalar subquery includes: analyzing whether the candidate scalar subquery uses a column included in a table of the main query to identify the candidate scalar subquery as the candidate correlated scalar subquery.

In the method, the transforming the query having the candidate correlated scalar subquery into a query of a quasi-JOIN includes: performing UNNEST on the query having the candidate correlated scalar subquery to create a query of AGGREGATION INNER/OUTER JOIN when the candidate correlated scalar subquery takes a type of returning a result of AGGREGATION.

In the method, the transforming the query having the candidate correlated scalar subquery into a query of a quasi-JOIN includes: performing UNNEST on the query having the candidate correlated scalar subquery to create a query of MAX1ROW INNER/OUTER JOIN when the candidate correlated scalar subquery takes a type of returning one column value.

In the method, the AGGREGATION INNER/OUTER JOIN functions to perform JOIN on the rows of the correlated scalar subquery with the rows of a main query and AGGREGATE on the joined rows and returns a result of the joined rows of the main query and aggregation value thereof.

In the method, the MAX1ROW INNER/OUTER JOIN functions to perform JOIN on the rows of the correlated scalar subquery with the rows of a main query, raises Error when the number of the joined rows of the subquery is two or more and returns a result of the row of the main query and the joined row of the subquery.

In the method, the quasi-JOIN conditionally processes the joined rows for a left row by an event type.

In the method, the quasi-JOIN is implemented by join algorithms having HASH JOIN, MERGE JOIN and NESTED LOOP JOIN.

In accordance with a second aspect of the present invention, there is provided a query compiler, which includes: a parser configured to parse a query provided to the query compiler; a query rewriter configured to analyze the parsed query to identify a correlated scalar subquery and transform the query having the identified correlated scalar subquery into a query of a quasi-JOIN according to a result type of the identified correlated scalar subquery; and a query optimizer configured to make a plurality of execution plans from the transformed query of a quasi-JOIN using statistical information, and select a query execution plan having a minimum cost among the plurality of execution plans.

In the query complier, the query rewriter identifies a scalar subquery included in SELECT clause, and the query rewriter identifies a scalar subquery written along with a comparison operator in the subquery while being included in WHERE clause. The query rewriter also identifies a scalar subquery using a column included in a table of the main query as the correlated scalar subquery.

In the query complier, the query rewriter performs UNNEST on the query having the correlated scalar subquery to create a query of AGGREGATION INNER/OUTER JOIN when the correlated scalar subquery takes a type of returning a result of AGGREGATION. Further, the query rewriter performs UNNEST on the query having the correlated scalar subquery to create a query of MAX1ROW INNER/OUTER JOIN when the correlated scalar subquery takes a type of returning one column value.

In the query complier, the AGGREGATION INNER/OUTER JOIN functions to perform JOIN on the rows of the correlated scalar subquery with the rows of a main query, AGGREGATE on the joined rows and returns a result of the joined rows of the main query and aggregation value thereof.

In the query complier, the MAX1ROW INNER/OUTER JOIN functions to perform JOIN on the rows of the correlated scalar subquery with the rows of a main query, raises Error when the number of joined rows of the subquery is two or more and returns a result of the row of the main query and the joined row of the subquery.

In the query complier, the quasi-JOIN is implemented by join algorithms having HASH JOIN, MERGE JOIN and NESTED LOOP JOIN.

In accordance with a third aspect of the present invention, there is provided a method for optimizing database queries, which includes: analyzing a query to identify INLINE VIEW; and transforming the query having the identified INLINE VIEW into a query of AGGREGATION INNER/OUTER JOIN when a main table and the result of INLINE VIEW are joined at N:1 or 1:1, wherein the AGGREGATION INNER/OUTER JOIN functions to perform JOIN on the rows of the result of INLINE VIEW without aggregation, AGGREGATE on the joined rows and returns a result of the joined rows of the main table and aggregation value thereof.

In accordance with a fourth aspect of the present invention, there is provided a method for optimizing database queries, which includes: analyzing a query to identify GROUP BY with AGGREGATION; and when JOIN is below the GROUP BY with AGGREGATION, all of the key columns in a main table is used as keys of GROUP BY, and columns in other table do not participate as a key of GROUP BY, transforming the query having the identified GROUP BY with AGGREGATION into a query of AGGREGATION INNER/OUTER JOIN, wherein the AGGREGATION INNER/OUTER JOIN functions to perform JOIN on the rows of the other table, AGGREGATE on the joined rows and returns a result of the joined rows of the main table and aggregation value thereof.

BRIEF DESCRIPTION OF THE DRAWINGS

The above and other objects and features of the present invention will become apparent from the following description of embodiments given in conjunction with the accompanying drawings, in which:

FIG. 7B illustrates a procedure of performing a second aggregation join by means of a HASH JOIN in accordance with the embodiment of the present invention; and FIG. 7C illustrates a procedure of performing MAX1ROW JOIN in accordance with the embodiment of the present invention.

DETAILED DESCRIPTION OF THE EMBODIMENTS

Hereinafter, embodiments of the present invention will be described in detail with reference to the accompanying drawings.

Figure 1:
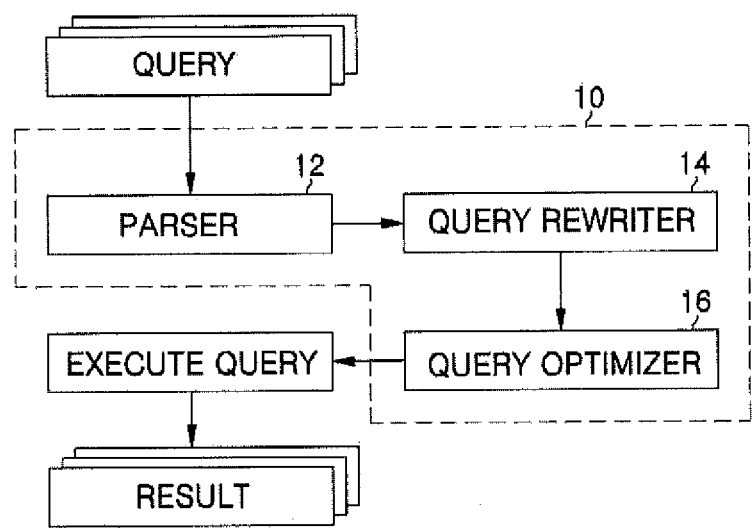
FIG. 1 illustrates a block diagram of a query compiler used in a database management system to which the present invention is applied.

FIG. 1 illustrates a block diagram of a query compiler 10 that is used in a database management system to which the present invention is applied. The query compiler 10 includes a parser 12, a query rewriter 14, and a query optimizer 16.

The parser 12 parses an SQL query provided to the query compiler 10 to form a structure such as a parse tree. During a parsing process, it is confirmed whether the query has a grammatical error and a semantic error, and the parsing process then proceeds to a query rewrite process. The query rewriter 14 makes a query having the parse tree structure more general to allow the query optimizer 16 to yield more query execution plans. The query optimizer 16 utilizes statistical information to generate a plurality of query execution plans from the rewritten query (revised parse tree) and selects a query execution plan having a minimum cost and optimized efficiency among the query execution plans. The query is executed according to the optimized execution plan generated and selected by the query optimizer 16 to return the executed results.

As set forth above, it is preferred that the query rewriter 14 is configured to make the query into a more general type so as to yield more query execution plans and remove parts of the query that are not need to be operated.

Among others, several representative query rewritings will be listed below.

1. Outer Join Simplification

This operation is to change OUTER JOIN into INNER JOIN if OUTER JOIN can be performed as INNER JOIN rather than OUTER JOIN due to schema information or conditions written in WHERE clause even though OUTER JOIN is within a query.

2. Simple View Merging

This operation removes VIEW used in a query and merges the query into an upper query block or a main query.

3. Expression Rewriting

When an expression included in a query is simply executable in advance or is complicated to take much time to execute, this operation changes the query to get a simple expression.

4. Subquery Unnesting

The operation unnests a subquery included in a query and merges the query into an upper query block, such that hierarchical structures between the query and the subquery have the same level.

Among the foregoing query rewriting operations, the Subquery Unnesting disclosed in No. 4 is related to the embodiments of the present invention.

The subquery which may be unnested by the Subquery Unnesting operation may be sorted into four types of subquery as follows.

4-1. Uncorrelated Scalar Subquery

This subquery returns only one row, without referring COLUMN from an upper query block. For example, the subquery may include a subquery written as follows.

```
select emp_no from emp
    where salary = (select max (salary) from emp)
```

4-2. Uncorrelated Non-Scalar Subquery

This subquery is a subquery returning multiple rows as a subquery result, without referring COLUMN from an upper query block. An example of this subquery may include a subquery written as follows.

```
select emp_no from emp
    where dept_code in
        (select dept_code from dept where company =
'tibero')
```

4-3. Correlated Scalar Subquery

This subquery is a subquery which refers COLUMN from a main query and returns only row. An example of the subquery may include a subquery written as follows.

```
select emp_no from emp m
    where salary = (select max (salary) from emp s
        where s.dept_code = m.dept_code)
```

4-4 Correlated Non-Scalar Subquery

This subquery is a subquery which refers COLUMN from a main query and returns multiple rows as a subquery result. An example of the subquery may include a subquery written as follows.

```
select emp_no from emp m
    where sold_item in (select sold_item from item s
        where s.htd > m.speciality)
```

Among the foregoing four subqueries, the uncorrelated scalar subquery has the same result value at all times, and therefore, needs not to be unnested. Meanwhile, the subqueries described in Nos. 4-2 to 4-4 are needed to be unnested.

The uncorrelated non-scalar subquery described in No. 4-2 is uncorrelated and thus, it looks like no need to perform a subquery unnesting; however, when a size of a table in the subquery is increased, it is always preferable to perform the subquery unnesting since the rows of subquery result must be compared to each row of a main query.

Meanwhile, the subqueries described in Nos. 4-3 and 4-4 are correlated subqueries and therefore, these subqueries need to be executed for each row of a main query. Accordingly, it is always preferable for these subqueries to perform the subquery unnesting.

Following is a description of four separate methods of processing an exemplary main query including a correlated scalar subquery, where the exemplary query represents to choose an employee who gets a maximum annual salary for his/her own department.

```
select emp_name
from emp m
where salary = (select max (salary)
    from emp s
    where m.dept_code = s.dept_code)
```

A first method does not perform a subquery unnesting on the scalar subquery within the main query. This method applies a correlated value to the scalar subquery in ROW by ROW and processes the scalar subquery in order to generate scalar value to be used in filter expression.

A second method is to rewrite the query as follows.

```
select emp_name
from emp m,
    (select dept_code, max (salary) maxsalary
    from emp group by dept_code) s
    where m.dept_code=s.dept_code and m.salary=s.maxsalary
```

That is, the second method performs GROUP BY and AGGREGATION in INLINE VIEW and then JOIN with the outer table as set forth above.

A third method is to add ROWID as a key for row in a main query and perform GROUP BY after JOIN. This method is represented by the SQL query as follows.

```
select emp_name
    from (select m.emp_name, m.salary, max (s.salary)
maxsalary
    from emp m, emp s
    where m.dept_code = s.dept_code
    group by m.rowid, m.emp_name, m.salary)
    where salary = maxsalary
```

The first method may be performed quickly by using a query cache of the scalar subquery when the number of departments is small. However, in the reverse case, the first method may have a disadvantage because subquery must be computed repeatedly as much as the number of departments.

The second method executes GROUP BY only once and then JOIN irrelevant to the number of departments (when using HASH JOIN). Therefore, the second method may be superior over the first method in speed when the number of departments is large. Meanwhile, when DISTINCT COUNT of correlated values is small, the second method may process the subquery using NESTED LOOP type and thus may be superior over the first method. However, the second method may have a disadvantage in that the same value is calculated again due to the absence of query cache and is difficult to discuss merits and demerits when using HASH JOIN. However, this method additionally performs grouping operation, and thus, has a disadvantage in that the memory is needed more and the processing time takes longer.

The third method is superior over the second method when the amount of grouping operation reduced by JOIN is large, and otherwise, greatly increases amount of grouping operation that is output as a result in JOIN as compared with the second method and thus, may not be good. Further, the third method also additionally performs grouping operation.

When the subquery result returns a column value but may produce multiple rows, the subquery may be shown like a query below.

```
select emp_name,
    (select dept_name from dept s
        where m.dept_code = s.dept_code)
    from emp m
```

For the SQL as set forth above, one subquery result per one row in the main query must come out, but when the subquery is unnested by the first to third methods, it is impossible to properly raise an error on the case when the subquery comes out one or more results. Therefore, the subquery cannot be unnested, and the execution operation for the subquery may be increased.

The inventors have tried numerous and repetitive executions with new JOIN type which enables JOIN algorithm (including NESTED LOOP, HASH, MERGE) to cover the first and second methods and shifts works to be processed at several nodes to JOIN node, by which the execution time can be reduced by internally using a cache and shortcut.

In the embodiments of the present invention, the query compiler 10 searches one or more subqueries in a query input by the user, identifies scalar subqueries from the searched subqueries, analyzes the identified scalar subqueries to identify a correlated scalar subquery, and converts the query having the correlated scalar subquery identified into a new query performing corresponding JOIN operation.

Herein, the term of a new JOIN refers a JOIN method newly proposed by the inventors that cannot be represented as an ordinary syntax of SQL. The new JOIN includes AGGREGATION (INNER/OUTER) JOIN and MAX1ROW (INNER/OUTER) JOIN. For convenience and proper representation, the new JOIN may be referred to as a quasi-JOIN in the embodiments.

Figure 2:
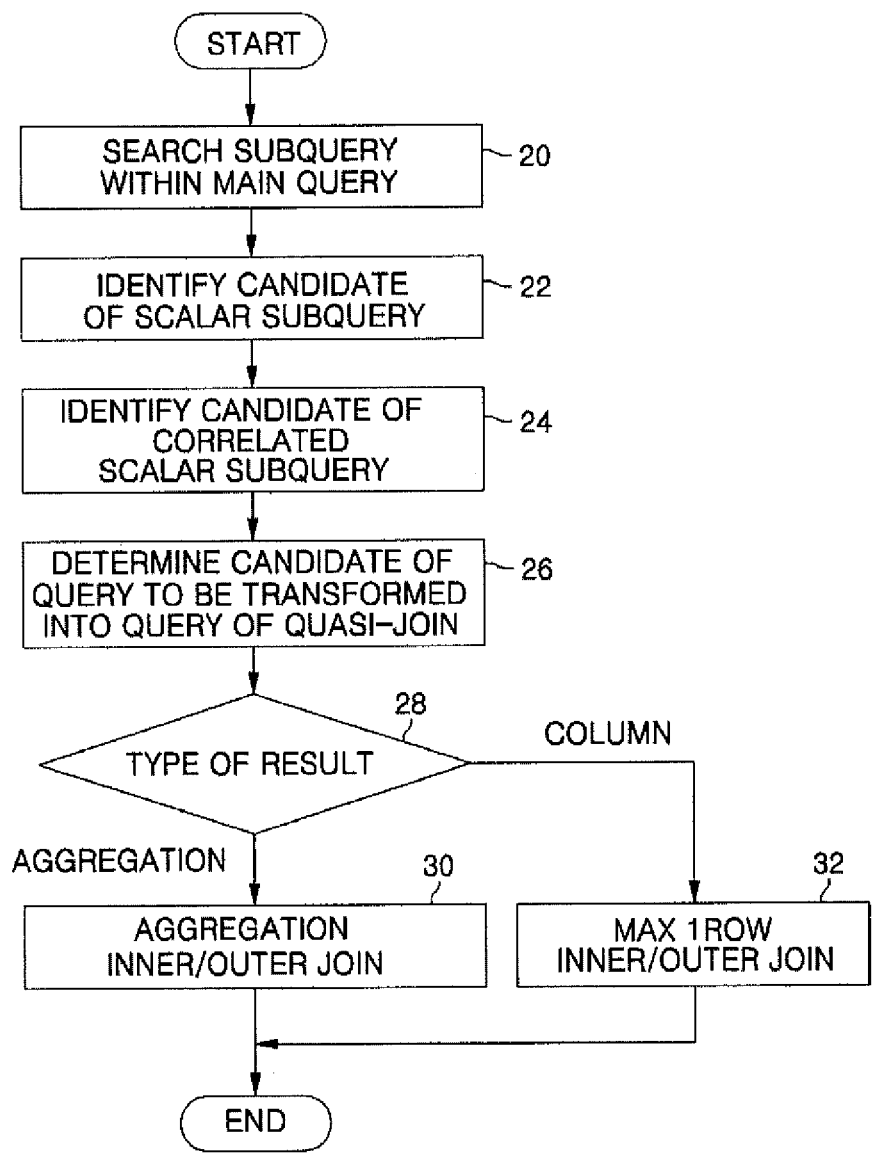
FIG. 2 shows a flow chart for a method of optimizing queries in accordance with an embodiment of the present invention.

Hereinafter, a method for optimizing database queries performed by the query compiler 10 will be described with reference to FIG. 2.

First, in operation 20, the query compiler 10 analyzes an SQL query to search the presence of a candidate subquery within a main query.

In operation 22, the query complier 10 analyzes the searched subquery to identify whether or not the searched subquery is a candidate of a scalar subquery. The query complier 10 may identify the searched subquery as the candidate scalar subquery when the searched subquery is written along with a comparison operator (=, > and the like) rather than a SET operator such as IN or EXIST while being included in WHERE clause or a subquery included in SELECT clause.

In operation 24, the query complier 10 analyzes the candidate scalar subquery to identify whether or not the candidate scalar subquery is a candidate of a correlated scalar subquery. The query compiler 10 may identify the scalar subquery as the correlated scalar subquery when the scalar subquery uses a column included in a table of a main query.

In operation 26, the query having the candidate correlated scalar subquery is determined as a candidate query and transformed into a query of quasi-JOIN.

The quasi-JOIN includes AGGREGATION (INNER/OUTER) JOIN and MAX1ROW (INNER/OUTER) JOIN, which are sorted depending on the result types of the correlated scalar subquery, i.e., AGGREGATION or COLUMN.

In operation 28, in a case that the candidate correlated scalar subquery has a type of returning a result of AGGREGATION, the method advances to operation 30 where the query compiler 10 performs UNNEST on the candidate query to create AGGREGATION INNER/OUTER JOIN Herein, the AGGREGATION INNER/OUTER JOIN functions to perform JOIN on the rows of the correlated scalar subquery with the rows of the main query, AGGREGATE on the joined rows and return a result of the joined rows of the main query and aggregation value thereof.

Figure 3A:
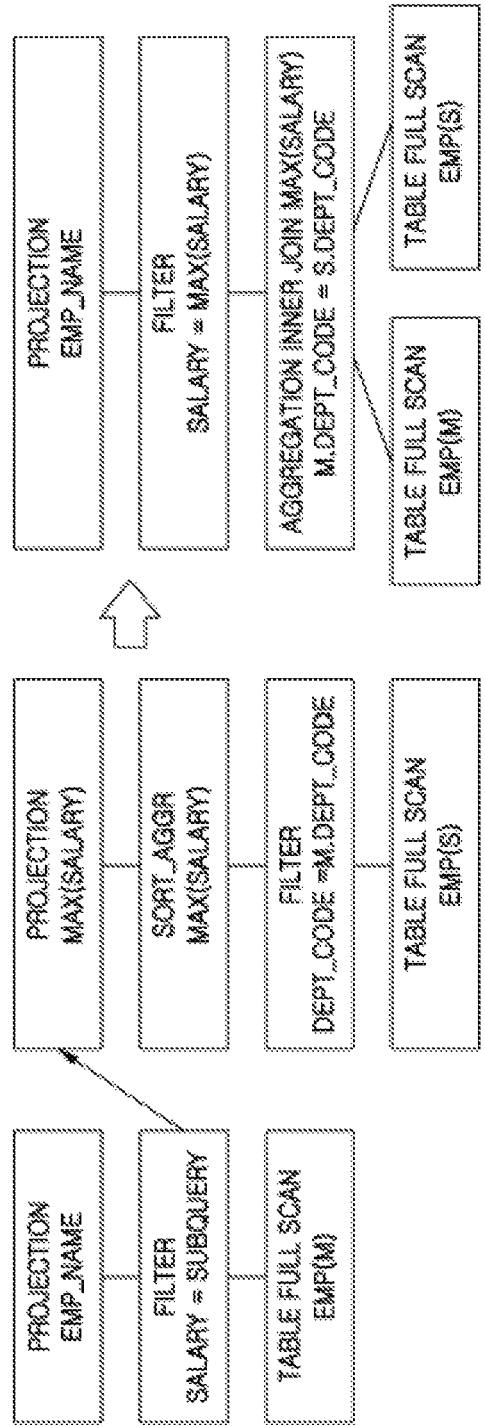
FIGS. 3A and 3B illustrate a procedure of performing UNNESTING on main queries each having a correlated scalar subqueries by AGGREGATION INNER/OUTER JOIN, in accordance with the embodiment of the present invention.

FIG. 3A illustrates, for example, a procedure of performing UNNEST on a candidate query having the following correlated scalar subquery to create a query of AGGREGATION INNER JOIN. Herein, the candidate query represents a query that outputs an employee that gets a maximum annual salary in his/her own department.

```
select emp_name
    from emp m
    where salary = (select max (salary)
        from emp s
        where m.dept_c_code = s.dept_code)
```

Figure 3B:
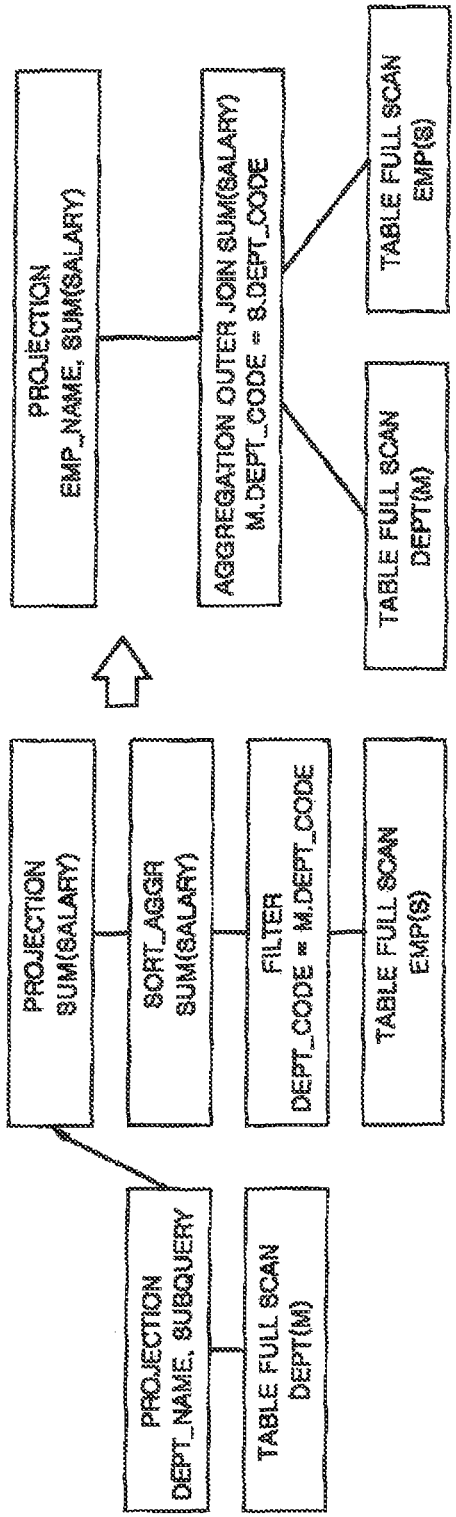

FIG. 3B illustrates, for example, a procedure of performing UNNEST on a candidate query having the following correlated scalar subquery to create a query of AGGREGATION OUTER JOIN. Herein, the candidate query represents a query that outputs a sum of annual salaries for each department.

```
select dept_name
    (select sum (salary)
    from emp s
    where m.dept_code = s.dept_code)
from dept m
```

Meanwhile, in operation 28, in a case that the candidate correlated scalar subquery has a type of returning one column value, the method advances to operation 32 where the query compiler 10 performs UNNEST on the candidate query to create a query of MAX1ROW INNER/OUTER JOIN. Herein, the MAX1ROW INNER/OUTER JOIN functions to perform JOIN on the rows of the subquery with the rows of the main query, raises ERROR when the joined rows of the subquery is two or more and returns a result of the rows of the main query and the joined rows of the subquery.

Figure 4A:
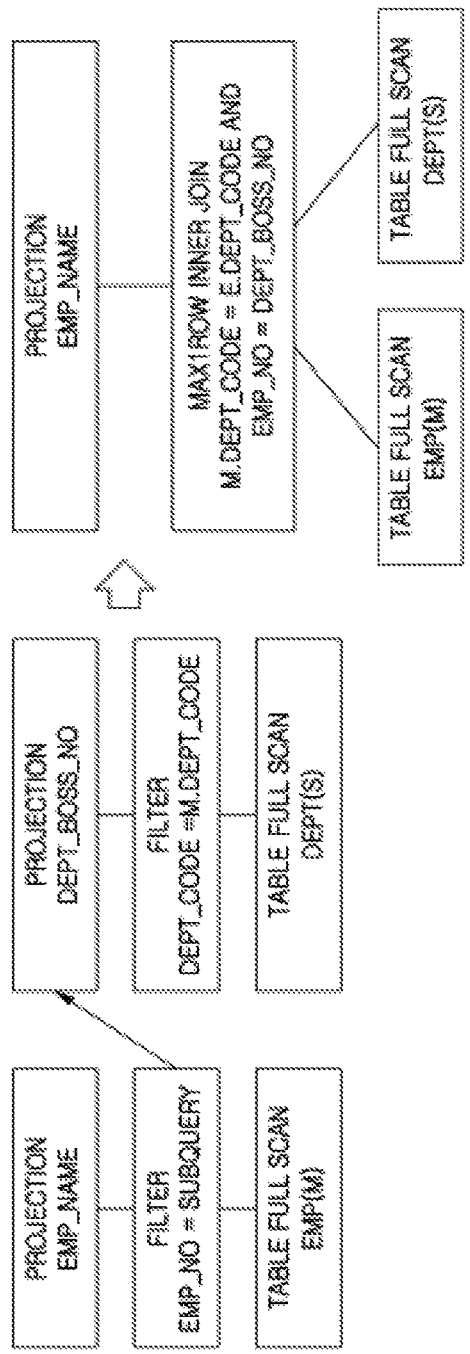
FIGS. 4A and 4B illustrate a procedure of performing UNNESTING on main queries each having a correlated scalar subqueries by MAX1ROW INNER/OUTER JOIN, in accordance with the embodiment of the present invention.

FIG. 4A illustrates, for example, a procedure of performing UNNEST on a candidate query having the following correlated scalar subquery to create a query of MAX1ROW INNER JOIN. Here, the candidate query represents a query that outputs a name of each department manager.

```
select emp_name
from emp m
where emp_no =
(select dept_boss_no
from dept s
where m.dept_code = s.dept_code)
```

Figure 4B:
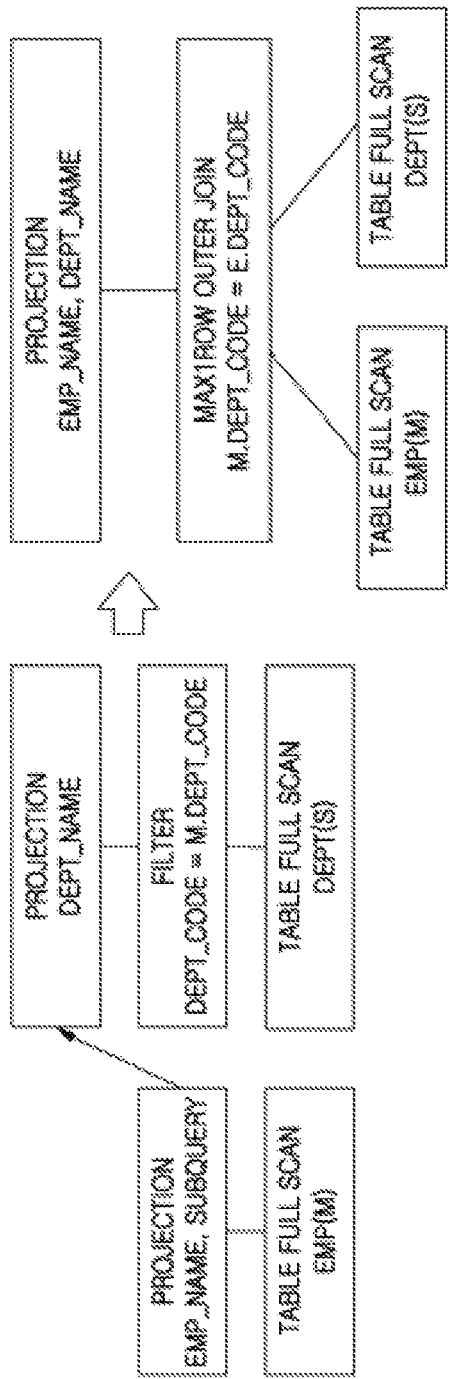

FIG. 4B illustrates, for example, a procedure of performing UNNEST on a candidate query having the following correlated scalar subquery to create a query of MAX1ROW OUTER JOIN. Herein, the candidate query is a query that outputs a name of an employee and a name of a department belonging to the employee.

```
select emp_name,
    (select dept_name from depts.
    where e.dept_code = d.dept_code)
from emp m
.
```

When the quasi-JOIN is actually executed by the query compiler 10, the candidate query having the candidate correlated scalar subquery is then transformed so as to be operated as JOIN.

The AGGREGATION JOIN of the quasi-JOIN supports three fundamental JOIN algorithms including HASH JOIN, NESTED LOOP JOIN, and MERGE JOIN and returns a result of AGGREGATION of left rows and joined right rows.

Meanwhile, the MAX1ROW JOIN clause of the quasi-JOIN also supports three fundamental JOIN algorithms including HASH JOIN, NESTED LOOP JOIN, and MERGE JOIN and has a difference in that Error occurred when the joined rows of the subquery are two or more for a corresponding row of the main query.

The foregoing embodiments have described a method for transforming the main query having the correlated scalar subquery into a query of quasi-JOIN. However, the query containing INLINE VIEW and some other types of query may be transformed into the quasi-JOIN scheme in accordance with the embodiment of the present invention. The other types of query are those included in queries that are described in the second and third methods above. These queries take a type that returns the same result as the query having the correlated scalar subquery and therefore, AGGREGATION JOIN may be applied these queries.

More specifically, for the second method above, when a table for Join operation is actually an INLINE VIEW statement that corresponds to GROUP BY with AGGREGATION, if the query satisfies the condition that another table and View are joined at N:1 or 1:1 by JOIN predicates that do not contain AGGREGATION, the candidate query can be converted into AGGREGATION JOIN of the quasi-JOIN by removing GROUP BY with AGGREGATION. As a result, it means that JOIN operation is combined with GROUP BY with AGGREGATION to become AGGREGATION JOIN. Herein, "another table and VIEW are joined at N:1" means that for each row in the other table, only one row of the view is joined, but this row of the view can be joined with multiple rows of the other table.

Figure 5A:
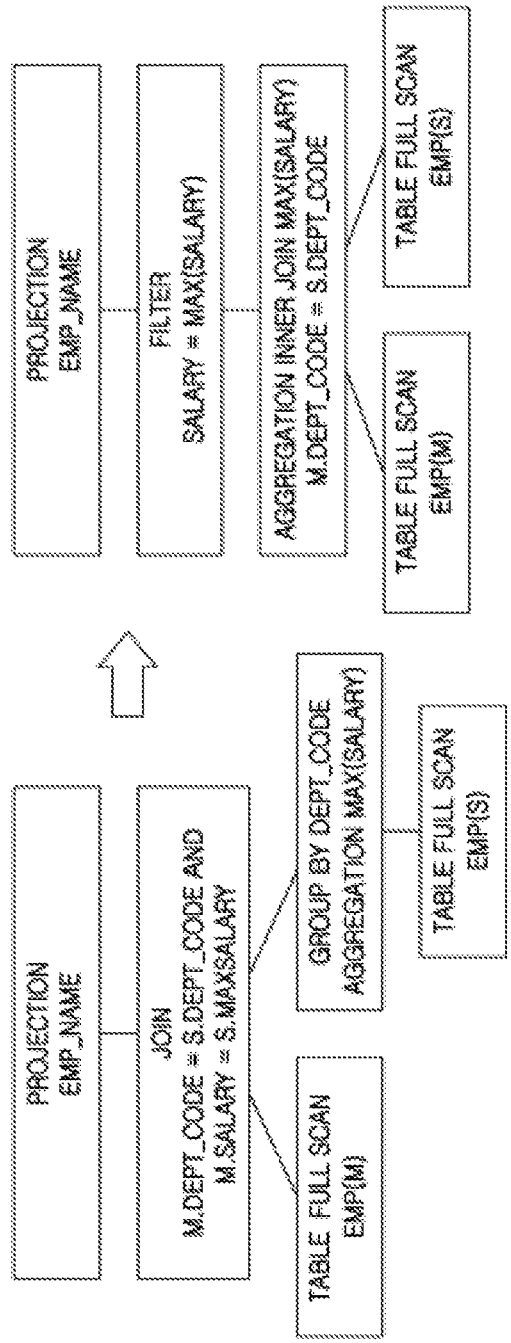
FIGS. 5A and 5B illustrate a procedure of performing UNNESTING on INLINE VIEW subquery other than the correlated scalar subqueries by AGGREGATION JOIN, in accordance with the embodiment of the present invention.

FIG. 5A illustrates, for example, a procedure of rewriting a candidate query having GROUP BY with AGGREGATION to create AGGREGATION JOIN. Herein, the candidate query represents a query that outputs an employee that gets a maximum annual salary in his/her own department.

```
select emp_name
from emp m,
    (select dept_code, max (salary) maxsalary
    from emp group by dept_code) s
where m.dept_code=s.dept_code and m.salary =
s.maxsalary
```

Meanwhile, for the third method above, the query has GROUP BY with AGGREGATION above JOIN clause. In this case, key columns of GROUP BY include key columns (a unique combination of columns in which the composite values of the column(s) of a row is not duplicated with other rows in the table) of one table and columns in the other table do not participate as a key of GROUP BY. The next query also represents a query that outputs an employee that gets a maximum annual salary in his/her own department.

```
select emp_name from (select m.emp_name, m.salary, max
(s.salary) maxsalary
    from emp m, emp s
    where m.dept_code = s.dept_code group by m.rowid,
m.emp_name, m.salary)
    where salary = maxsalary
```

As can be appreciated from the above query, m and s are joined, and rowid, emp_name, dept_code, salary of m are then grouped. The rowid is a unique value in emp m and emp s is only referenced in aggregation and not in GROUP BY clause, thereby creating AGGREGATION JOIN.

Figure 5B:
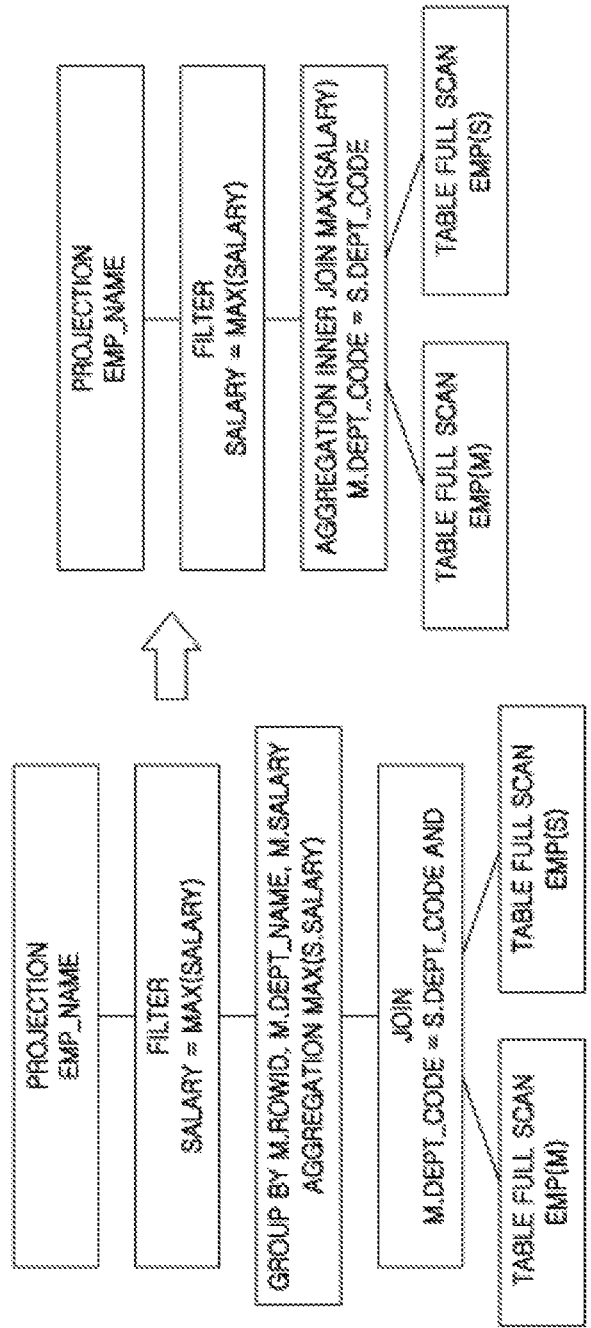

FIG. 5B illustrates a procedure of rewriting the foregoing query to create a query of AGGREGATION JOIN.

Therefore, as described above, the execution speed of the query may be improved by converting the correlated scalar subquery included in the query into the join type.

Figure 6A:
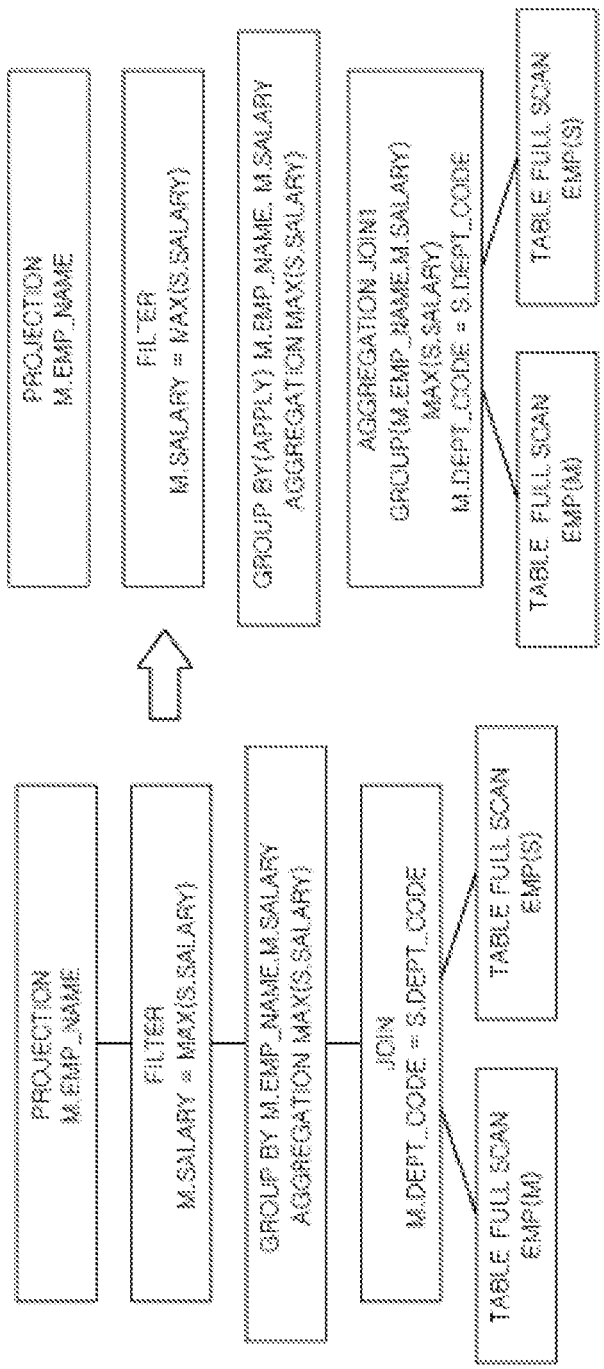
FIGS. 6A and 6B illustrate a creation of a first aggregation join and a second aggregation join in accordance with the embodiment of the present invention.
Figure 6B:
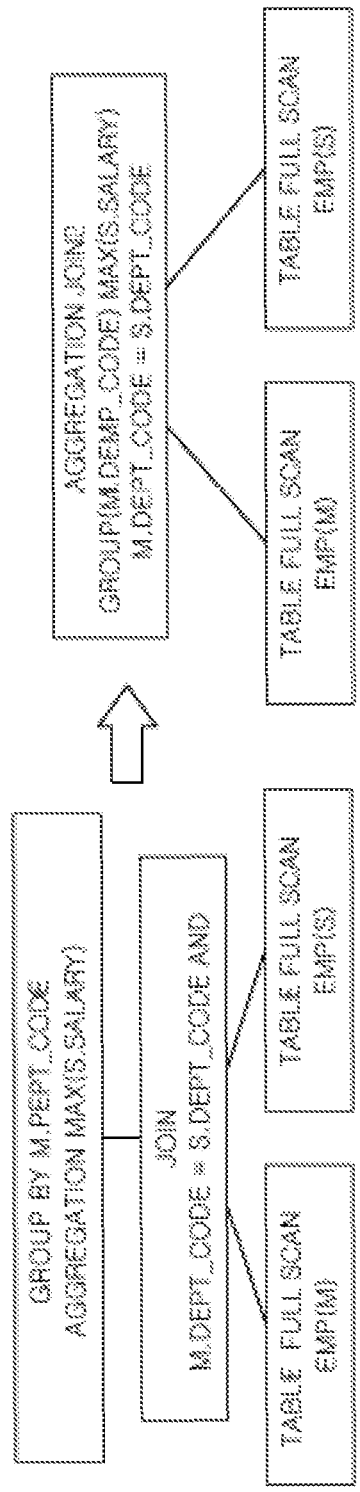

FIGS. 6A and 6B illustrate a creation of a first aggregation join (referred also to 'aggr_join1') and a second aggregation join (referred also to 'aggr_join2') relative to a prior art in accordance with the embodiment of the present invention. Specifically, FIG. 6A illustrates an example of the change of an SQL query execution plan where an SQL query having Join and Group by with Aggregation is transformed into a type of a first aggregation join (aggr_join1). In this example, the SQL query represents an example query that select employees that get a maximum annual salary in their departments.

```
Select m.emp_name
From emp m, emp s
Where m.dept_code= s.dept_code
Group by m.emp_name, m.salary
having max(s.salary) = m.salary;
```

The first aggregation join (aggr_join1) of the embodiment of the present invention yields results as many as the number of the employees, while a prior art yields results as many as "(the number of employees)*(the number of members in the department that each of the employees belongs to)" since all the members in the department are joined for each member in a Join clause and then groups the results by "the number of the employees" at a node of a Group by Aggregation.

FIG. 6B illustrates an example of the change of an SQL query execution plan where an SQL query having Join and Group by with Aggregation is transformed into a type of a second aggregation join (aggr_join2). In this example, the SQL query represents a query that select employees that get a maximum annual salary in their departments.

```
Select max(s.salary)
From emp m, emp s
Where m.dept_code = s.dept_code
Group by m.dept_code;
```

The second aggregation join (aggr_join2) of the embodiment of the present invention yields results as many as "the number of the departments", while a prior art yields results as many as "(the number of employees)*(the number of members in the department that each of the employees belongs to)" since all the members in the department are joined for each member and then groups the results by "(the number of the departments)" at a node of a Group by Aggregation.

Figure 7A:
FIG. 7A illustrates a procedure of performing a first aggregation join by means of HASH JOIN in accordance with the embodiment of the present invention.
Figure 7A:
Figure 7A:

FIG. 7A illustrates a procedure of performing a first aggregation join by means of Hash Join in accordance with the embodiment of the present invention; and FIG. 7B illustrates a procedure of performing a second aggregation join by means of Hash Join in accordance with the embodiment of the present invention.

First of all, a quasi-JOIN refers to a join to process grouping and aggregation, in which Group by Aggregation and a first aggregation join that is a lower node of the Group by Aggregation are merged together. The quasi-JOIN may include a first aggregation join (aggr_join1) in which join keys and group keys do not match each other and a second aggregation join (aggre_join2) in which join keys and group keys match each other.

The first aggregation join creates a result of a first aggregation join with respect to the group keys when the join keys and the groups have a matching condition. In this case, the first aggregation join groups the group keys within an allowed range of a memory to delivery to a Group by Aggregation node that is an upper node of the first aggregation join, which in turn receives partially grouped groups and an aggregation structure through its rows and merges the aggregation structures with respect to rows having the same group key to return a completely grouped result. Of course, even if it is possible to make the first aggregation join without creation of the Group by Aggregation by way of storing in a disk, the first aggregation join may be implemented in a way of adding nodes of the Group by Aggregation thereto since it is preferable to create the Group by Aggregation in terms of compatibility with an existing join scheme. Consequently, the first aggregation join does not have any overhead causing rows to be joined and returns only the group keys and aggregation. In addition, rows with the same join key, which belong to a same group, with respect to the join keys, are recycled by calculating the aggregation once, which may result in reducing the computational amount and workload of the processing units such as CPUs.

It is assumed that a table to which the group keys of the first aggregation join belong is a group table and a table to which the columns used in performing an aggregation belong is an aggregation table. The first aggregation join is created under a situation that when both the tables are joined, the columns belonged to any one of the tables are selected as the group keys, and the group keys and the join keys do not match each other when the aggregation is performed with the columns belonged to the other table. The node of the first aggregation join designates the rows having the same join key as one join key group using the group table, produces each structure to store the aggregation for each designated join key group, and calculates an aggregation value for the aggregation structure of the join key group relevant to the join key while searching the aggregation table in a way of calculating each join key group once only even though each join key group has several rows. If there is a shortage of storage space in the memories in the course of performing the first aggregation join, the aggregation join may transfers the group keys for the rows belonged to the join key group and the structures capable of merging the aggregation results to the Group by Aggregation that is an upper node, which in turn merges the aggregation structures for each same group to return the result of the Group by aggregation.

Further, it is assumed that a table to which the group keys belong is a group table and a table to which the columns used in performing an aggregation belong is an aggregation table. The second aggregation join is created under a situation that when both the tables are joined, the columns belonged to any one of the tables are selected as the group keys and the group keys and the join keys match each other when the aggregation is performed with the columns belonged to the other table. Unlike the first aggregation join, the second aggregation join does not have any nodes of the Group by Aggregation at an upper node of the second aggregation join. Accordingly, the second aggregation join does not have any overhead causing the column to be calculated at the node of the Group by Aggregation. In addition, rows, which belong to a same group, with respect to the group table, are calculated once and then recycled, which may result in reducing the computational amount and workload of the processing units such as CPUs.

Further, the second aggregation join designates the rows having the same join key in the group table as one group, produces each structure to store aggregation for each designated group and variables to count the rows having the same join key in the group table. Here, the second aggregation join returns the result of performing the aggregation with the group key substituted for the join key by self-merging the aggregations as many as the number of the rows counted for each join key.

In the following, in a case where the join key is Equal Join, it will be described separately about a case where the first aggregation join is performed by means of HASH JOIN and a case where the first aggregation join is performed by means of SORTMERGE JOIN. In FIG. 7A, a group table on a left of JOIN becomes a driving table and an aggregation table on a right of JOIN becomes an inner table. Here, the terms "driving table" and "group table" are defined as synonyms and "aggregation table" and "inner table" are also defined as synonyms.

In a case where the first aggregation join is performed by means of HASH JOIN as illustrated in FIG. 7A, the HASH JOIN creates a hash table with respect to the driving table, wherein a hash key may be a join key. When creating the hash table, the HASH JOIN groups the rows having same join key as one group and allows the group to get a structure to store aggregation. After creating the hash table, the HASH JOIN performs a join operation for each row in the inner table to calculate a value of the inner table in performing the aggregation of the row group relevant to the join key. During this operation, one calculation is carried out for one group even though there are multiple matching rows in the hash table. After the repeated calculation for each rows in the inner table, the rows in the driving table transfers the group keys to the node of Group By aggregation that is an upper node, along with the structures other than the aggregation value of the group to which the rows themselves belong, i.e., the structures that can merge the aggregation results. The node of Group by Aggregation merges the structures with respect to the same groups to return a complete result of Group by Aggregation.

Meanwhile, in a case where the first aggregation join is performed by way of SORTMERGE JOIN, driving table and inner table rows are sorted by join keys in SORTMERGE JOIN. Therefore, the SORTMERGE JOIN transfers the group keys and aggregation for same join key rows in the driving table when a value of the join keys in the driving table is changed and rows having the same join key in the driving table produced through the once calculation of the aggregation until the value of the join keys in the inner table is changed to the node of Group By aggregation that is an upper node, along with the aggregation structure that has been calculated initially. The remaining operations after the above-mentioned operation are identical to those in the HASH JOIN and thus duplicate descriptions will be omitted.

In the following, it will be described separately about a case where the second aggregation join is performed by way of HASH JOIN with reference with FIG. 7B and a case where the second aggregation join is performed by means of SORTMERGE JOIN.

In a case where the second aggregation join is performed by means of HASH JOIN as illustrated in FIG. 7B, the second aggregation join has the join keys and the group keys that match each other; therefore, needs not to produce a node of Group by Aggregation that is an upper node as similar as in the first aggregation join. Thus, in a case where the second aggregation join is performed by means of HASH JOIN, the second aggregation join, when making a hash table for the join keys, carries out an counting operation with respect to the rows having the same join key, but keeps only one row. Basic operations of the second aggregation join may be same as those of the first aggregation join. After the completion of the join operation, the second aggregation join self-merges the aggregations as many as the number of the counted rows for each join key and then returns the result of Group by Aggregation with the join key substituted for the group key.

In a case where the second aggregation join is performed through the SORTMERGE JOIN, the second aggregation join calculates the aggregation once by consecutively repeating the rows such as the join key values in the driving table when the values are changed and the same row, self-merges the aggregations as many as the number of the counted rows and then returns the result of Group by Aggregation with the join key substituted for the group key.

As set forth above, the first aggregation join and the second aggregation join return a reduced number of join results in comparison with an existing join scheme because they serialize the results and do not have any overheads causing the columns to be calculated again for a relevant row at the node of Group by Aggregation. Further, the first aggregation join and the second aggregation join enables the Group by Aggregation and the Join operations to be effectively carried out together by adding some additional memories. Furthermore, in the second aggregation join, only one aggregation is calculated with respect to each row having the same join key, which may result in reducing the workload of the processing units such as CPUs.

FIG. 7C illustrates a procedure of performing MAX1ROW JOIN in accordance with the embodiment of the present invention. Such a MAX1ROW JOIN may generate errors when at least two rows are joined among the rows in the driving table. More specifically, in a case where MAX1ROW JOIN is performed by means of Hash Join, a joined flag is placed on each row in the hash table and the rows are joined by consecutively repeating the rows in the inner table to set the joined flag for the rows that are joined. If the joined flag has been already set, an error is produced. For Nested Loop or SORTMERGE JOIN, the number of the rows that are joined in the driving table are counted and an error is issued when the counted number exceed a threshold of 2

In FIG. 7C, a table on a left of Join is a driving table and a table on a right of Join is an inner table. As illustrated in FIG. 7C, in a case where the join key has a condition of Col1=Col4, there exist two rows having the same value of 31 in the inner table as that on a Col1 in the driving table, which causes an error. In other word, the MAX1ROW JOIN generates an error when there is a plurality rows that are joined in the inner table with respect to the rows in the driving table. The reason of the generation of error is that while only one node is needed to be returned from the scalar subquery, a plurality of rows may be returned as a result of the scalar subquery due to an error in an actual data or an unskilled use of the SQL. However, if the scalar subquery destined to produce an error is unnested by means of Join, an incorrect result may be returned instead of generating an error.

As described above, in the prior art, the scalar subquery is transformed into Join clause under a condition that only one row is returned as the result of the scalar subquery operation. On the contrary, the embodiments of the present invention always enables the MAX1ROW JOIN to transform the scalar subquery into Join while preventing the error from being generated when transforming the scalar subquery into the join.

As set forth above, it is possible to increase a possibility of making more execution plans by converting correlated scalar subqueries included in a query into a join type as compared with the related art and improve an execution speed of a query.

While the invention has been illustrated and described with respect to the preferred embodiments, the present invention is not limited thereto. It will be understood by those skilled in the art that various changes and modifications may be made without departing from the scope of the invention as defined in the following claims.

What is claimed is:

1. A method for optimizing database queries in a query compiler, comprising:
searching a subquery within a query;
analyzing the searched subquery to identify a candidate of a scalar subquery;
analyzing the candidate scalar subquery to identify a candidate of a correlated scalar subquery; and
transforming the query having the candidate correlated scalar subquery into a query of a quasi-JOIN depending on a result type of the candidate correlated scalar subquery,
wherein the quasi-JOIN is a join to process grouping and aggregation, in which Group by Aggregation and Join that is a lower node of the Group by Aggregation are merged together and the quasi-JOIN includes a first aggregation join in which join keys and group keys do not match each other and a second aggregation join in which join keys and group keys match each other;
wherein the first aggregation join creates a result in which the group keys are partially grouped and subjected to Aggregation when the join keys and the groups have a matching condition, wherein the results for the rows with the group keys that are duplicated are grouped at a Group by Aggregation that is an upper node;
wherein the second aggregation join returns a result in which the group keys are grouped and subjected to Aggregation when the join keys and the groups have a matching condition;
wherein a table to which the group keys belong is a group table and a table to which the columns used in performing the aggregation belong is an aggregation table;
wherein the first aggregation join is created under a situation that when both the tables are joined, the columns belonging to any one of the tables are selected as the group keys, and the group keys and the join keys do not match each other when the aggregation is performed with the columns belonging to the other table; and
wherein the first aggregation join is configured to:
designate the rows having the same join key as one group to produce each structure to store the aggregation for each designated group; and
calculate an aggregation value for the aggregation structure of the join key group relevant to the join key while searching the aggregation table in a way of calculating each join key group once only even though each join key group has several rows.

2. The method of claim 1, wherein said analyzing the searched subquery comprises:
analyzing whether the searched subquery is written along with a comparison operator while being included in WHERE clause to identify the searched subquery as the candidate scalar subquery.

3. The method of claim 1, wherein said analyzing the searched subquery includes:
analyzing whether the searched subquery is included in SELECT clause to identify the searched subquery as the candidate scalar subquery.

4. The method of claim 1, wherein said analyzing the candidate scalar subquery comprises:
analyzing whether the candidate scalar subquery uses a column included in a table of the main query to identify the candidate scalar subquery as the candidate correlated scalar subquery.

5. The method of claim 1, wherein said transforming the query having the candidate correlated scalar sub query into a query of a quasi-JOIN includes:
performing UNNEST on the query having the candidate correlated scalar subquery to create a query of AGGREGATION INNER/OUTER JOIN when the candidate correlated scalar subquery takes a type of returning a result of AGGREGATION.

6. The method of claim 1, wherein said transforming the query having the candidate correlated scalar sub query into a query of a quasi-JOIN includes:
performing UNNEST on the query having the candidate correlated scalar subquery to create a query of MAX1ROW INNER/OUTER JOIN when the candidate correlated scalar subquery takes a type of returning one column value.

7. The method of claim 5, wherein the AGGREGATION INNER/OUTER JOIN functions to perform JOIN on the rows of the correlated scalar subquery with the rows of the main query and AGGREGATE on the joined rows and returns a result of the joined rows of the main query and aggregation value thereof.

8. The method of claim 6, wherein the MAX1ROW INNER/OUTER JOIN functions to perform JOIN on the row of the correlated scalar subquery with the rows of the main query, raises Error when the number of the joined rows of the subquery is two or more and returns a result of the row of the main query and the joined row of the subquery.

9. The method of claim 1, wherein the quasi-JOIN is implemented by join algorithms having HASH JOIN, MERGE JOIN and Nested Loop Join.

10. The method of claim 1, wherein when there is a shortage of storage space in the memories in the course of performing the join;
and wherein the first aggregation join is further configured to:
transfer the group keys for the rows belonging to the join key group and the structures capable of merging the aggregation results to the Group by Aggregation that is an upper node, wherein the Group by Aggregation merges the aggregation structures for each same group to return the result thereof.

11. The method of claim 1, wherein the second aggregation join is configured to:
designate the rows having the same join key in the group table as one group; and
produce each structure to store aggregation for each designated group and variables to count the rows having the same join key in the group table.

12. The method of claim 11, wherein the second aggregation join is configured to:
return the result of performing the aggregation with the group key substituted for the join key by self-merging the aggregations as many as the number of the rows counted for each join key.

13. The method of claim 5, wherein the MAX1ROW JOIN generates an error when at least two rows are joined among the rows in the driving table.

14. A non-transitory computer readable medium comprising machine readable instructions executable by a processor, the instructions comprising a query compiler, the query compiler comprising:
a parser configured to parse a query provided to the query compiler;
a query rewriter configured to analyze the parsed query to identify a correlated scalar subquery, and transform the query having the identified correlated scalar subquery into a query of a quasi-JOIN according to a result type of the identified correlated scalar subquery; and a query optimizer configured to make a plurality of execution plans from the transformed query of a quasi-JOIN using statistical information, and select a query execution plan having a minimum cost among the plurality of execution plans, wherein the quasi-JOIN is a join to process grouping and aggregation, in which Group by Aggregation and Join that is a lower node of the Group by Aggregation are merged together and the quasi-JOIN includes a first aggregation join in which join keys and group keys do not match each other and a second aggregation join in which join keys and group keys match each other;

wherein the first aggregation join creates a result in which the group keys are partially grouped and subjected to Aggregation when the join keys and the groups have a matching condition, wherein the results for the rows with the group keys that are duplicated are grouped at a Group by Aggregation that is an upper node;

wherein the second aggregation join returns a result in which the group keys are grouped and subjected to Aggregation when the join keys and the groups have a matching condition;

wherein a table to which the group keys belong is a group table and a table to which the columns used in performing the aggregation belong is an aggregation table;

wherein the first aggregation join is created under a situation that when both the tables are joined, the columns belonging to any one of the tables are selected as the group keys, and the group keys and the join keys do not match each other when the aggregation is performed with the columns belonging to the other table; and wherein the first aggregation join is configured to:

designate the rows having the same join key as one group to produce each structure to store the aggregation for each designated group; and calculate an aggregation value for the aggregation structure of the join key group relevant to the join key while searching the aggregation table in a way of calculating each join key group once only even though each join key group has several rows.

15. The query compiler non-transitory computer readable medium of claim 14, wherein when there is a shortage of storage space in the memories in the course of performing the join;

and the first aggregation join is further configured to:

transfer the group keys for the rows belonging to the aggregation group and the structures capable of merging the aggregation results to the Group by Aggregation that is an upper node, wherein the Group by Aggregation merges the aggregation structures for each same group to return the result thereof.

* * * * *